US010431112B2

(12) United States Patent
Ward

(10) Patent No.: US 10,431,112 B2
(45) Date of Patent: Oct. 1, 2019

(54) COMPUTERIZED SYSTEMS AND METHODS FOR CATEGORIZING STUDENT RESPONSES AND USING THEM TO UPDATE A STUDENT MODEL DURING LINGUISTIC EDUCATION

(71) Applicant: Arthur Ward, Pittsburgh, PA (US)

(72) Inventor: Arthur Ward, Pittsburgh, PA (US)

(73) Assignee: Arthur Ward, Pittsburgh, PA (US)

( * ) Notice: Subject to any disclaimer, the term of this patent is extended or adjusted under 35 U.S.C. 154(b) by 321 days.

(21) Appl. No.: 15/346,346

(22) Filed: Nov. 8, 2016

(65) Prior Publication Data
US 2018/0096624 A1 Apr. 5, 2018

Related U.S. Application Data
(60) Provisional application No. 62/403,405, filed on Oct. 3, 2016.

(51) Int. Cl.
*G09B 17/00* (2006.01)
*G09B 5/08* (2006.01)
(Continued)

(52) U.S. Cl.
CPC .......... *G09B 17/00* (2013.01); *G06Q 10/109* (2013.01); *G06Q 50/20* (2013.01); *G06Q 50/205* (2013.01); *G09B 5/08* (2013.01); *G09B 5/125* (2013.01)

(58) Field of Classification Search
CPC ................................ G09B 19/06; G09B 19/04
(Continued)

(56) References Cited

U.S. PATENT DOCUMENTS 5,634,086 A 5/1997 Rtischev et al.
5,870,709 A 2/1999 Bernstein
(Continued)

OTHER PUBLICATIONS

International Search Report and Written Opinion of the International Searching Authority for International Application No. PCT/US2017/057833 dated Dec. 15, 2017.

*Primary Examiner* — Robert J Utama
(74) *Attorney, Agent, or Firm* — K&L Gates LLP

(57) ABSTRACT

Computer-based systems and methods support linguistic education between a tutor and a student using mobile computing devices with touchscreen user interfaces for both that allow the tutor to deliver lesson prompts and monitor in real-time, on his/her mobile device, responses made by the student on the student's mobile device. The linguistic lessons can be quickly created and individualized for each student, based on statistical estimates of student knowledge of each concept in the appropriate scope and sequence. The planned lesson may then be downloaded onto the tutor's mobile device for delivery in a tutoring session. The tutor uses the touchscreen interface of the tutor mobile device to select concept prompts in the downloaded lesson. These prompts can then be displayed on the student's input device. The student may use an input component of the student mobile device to enter a response that is then transmitted back to the tutor mobile device. The student may also answer orally. The tutor, through the touchscreen interface of the tutor mobile device, records correctness and the required hint level for each student response given during a lesson. These records can then be uploaded to the host computer system and used to update a Student Model after the lesson is complete. After it is updated, the Student Model can be used to plan the next lesson for that student.

17 Claims, 5 Drawing Sheets

(51) Int. Cl.
  *G06Q 10/10* (2012.01)
  *G06Q 50/20* (2012.01)
  *G09B 5/12* (2006.01)

(58) Field of Classification Search
  USPC .................................................. 434/156, 157
  See application file for complete search history.

(56) References Cited

U.S. PATENT DOCUMENTS

| | | | |
|---|---|---|---|
| 6,434,738 B1* | 8/2002 | Arnow | G06F 8/41 709/202 |
| 6,471,521 B1* | 10/2002 | Dornbush | G09B 5/14 434/322 |
| 6,654,785 B1* | 11/2003 | Craig | G06F 17/30873 707/999.001 |
| 8,777,626 B2* | 7/2014 | Levy | G09B 17/003 434/156 |
| 9,058,751 B2* | 6/2015 | Dohring | G09B 19/06 |
| 9,378,650 B2* | 6/2016 | Kadar | G09B 5/06 |
| 9,858,828 B1* | 1/2018 | Fuka | G09B 7/00 |
| 2002/0115044 A1* | 8/2002 | Shpiro | G09B 5/06 434/156 |
| 2002/0164563 A1* | 11/2002 | Wasowicz | G09B 5/04 434/178 |
| 2002/0169822 A1* | 11/2002 | Packard | G09B 7/00 709/203 |
| 2003/0061187 A1* | 3/2003 | Fukui | G09B 5/00 706/45 |
| 2004/0076935 A1 | 4/2004 | Kelley et al. | |
| 2004/0128292 A1 | 7/2004 | Kinnell | |
| 2005/0089828 A1 | 4/2005 | Ayaz | |
| 2007/0174041 A1 | 7/2007 | Yeske | |
| 2007/0287518 A1* | 12/2007 | Nagel | A63F 3/022 463/9 |
| 2008/0160487 A1* | 7/2008 | Fairfield | G09B 7/02 434/169 |
| 2008/0254437 A1* | 10/2008 | Heffernan | G09B 7/02 434/362 |
| 2008/0280269 A1* | 11/2008 | Yeung | G09B 19/04 434/157 |
| 2010/0285441 A1* | 11/2010 | Heffernan | G09B 7/02 434/350 |
| 2012/0021390 A1* | 1/2012 | Dodd | G09B 19/04 434/185 |
| 2012/0094265 A1* | 4/2012 | Boler | G09B 7/00 434/362 |
| 2012/0251985 A1 | 10/2012 | Steels et al. | |
| 2013/0034839 A1* | 2/2013 | Heffernan | G06Q 10/10 434/350 |
| 2013/0252212 A1* | 9/2013 | Purushotma | G09B 19/06 434/157 |
| 2014/0011176 A1* | 1/2014 | Mayumi | G09B 5/14 434/336 |
| 2014/0162239 A1 | 6/2014 | Roach | |
| 2015/0024348 A1* | 1/2015 | ElAzizi | G09B 5/02 434/112 |
| 2015/0057994 A1 | 2/2015 | Fang et al. | |

* cited by examiner

US 10,431,112 B2

COMPUTERIZED SYSTEMS AND METHODS FOR CATEGORIZING STUDENT RESPONSES AND USING THEM TO UPDATE A STUDENT MODEL DURING LINGUISTIC EDUCATION

PRIORITY CLAIM

The present application claims priority to U.S. provisional patent application Ser. No. 62/403,405, filed Oct. 3, 2016, entitled "System and method to support linguistic education," by inventor Arthur Ward, which is incorporated herein by reference in its entirety.

BACKGROUND

One of the most effective treatments for dyslexia and other reading impairments is one-on-one tutoring with a human tutor. These tutoring sessions typically involve explicit, sequential instruction and drill in linguistic concepts, such as individual lexeme-phoneme relationships. To prepare these lessons, the tutors must consider the student's current knowledge level to decide which linguistic concepts should be included in the lesson, selected from a scope and sequence of many hundred concepts. Having selected concepts, the tutor must then select prompts for each concept. These prompts, which may include lexemes, phonemes, words and sentences, are delivered during the lesson, at which time the tutor should record the student's response. Information about each response is potentially useful when the tutor plans the next lesson, perhaps informing the decision to repeat concepts that gave the student trouble, or to leave out concepts that seem to have been mastered. Response information, however, is difficult to collect during tutoring sessions, and very difficult to organize and search in a useful manner. The difficulty of recording and categorizing student responses is a major barrier to making linguistic lessons more efficient and effective.

SUMMARY

In one general aspect, the present invention is directed to computer-based systems and methods that support linguistic education between an instructor and one or more students. The present invention, in various embodiments, uses mobile computing devices with touchscreen user interfaces for both the instructor (e.g., a "tutor") and the student. This allows the tutor to deliver lesson prompts and monitor in real-time, on his/her mobile device, responses made by the student on the student's mobile device.

In various embodiments, the present invention allows a tutor to quickly create linguistic lessons which are individualized for each student, based on statistical estimates of student knowledge of each concept in the appropriate scope and sequence. The planned lesson may then be downloaded onto the tutor's mobile device for delivery in a tutoring session.

In one embodiment, the tutor uses the touchscreen interface of the tutor mobile device to select concept prompts in the downloaded lesson. These prompts can then be displayed on the student's input device. The student may use an input component of the student mobile device, e.g., the touchscreen user interface, to enter a response that is then transmitted back to the tutor mobile device. The student may also answer orally, with the student's response recorded by the student's device and with the response transmitted back to the tutor mobile device. Alternatively, oral responses can be heard directly by the tutor (e.g., if they are in the same room).

The tutor, through the touchscreen interface of the tutor mobile device, records correctness and the required hint level for each student response given during a lesson. These records can then be uploaded to the host computer system and used to update the Student Model after the lesson is complete. After it is updated, the Student Model can be used to plan the next lesson for that student.

One advantage of the present invention, in various embodiments, is that it allows the tutor to quickly record student responses and the hint levels that had been required to elicit them, as described below. A second advantage is that embodiments of the present invention enable real-time monitoring and tracking of the student's performance during the lesson using information from student responses and hint levels. It can then automatically update the system's estimates of the student's current skill level. These updated estimates can be used to select concepts when planning the next lesson. This helps overcome the difficulty of collecting response information quickly enough to not disrupt the ongoing lesson. It also helps ease the difficulty of manually finding the optimal set of concepts to include the next lesson. Embodiments of the present invention, therefore, can be very effective for students that need customized linguistic training, such as students with dyslexia. It also provides a technical solution over other computer-based linguistic systems that do not provide any interface mechanism to record or categorize the student's responses, that do not generate the lesson plans based on the student's particularized student model, and that do not update the student's model after the collection of the student's responses.

FIGURES

Various embodiments of the present invention are described herein by way of example in connection with the following figures, wherein:

FIG. 1 provides an overview of one possible system architecture according to various embodiments of the present invention. This figure depicts the student model; the lexicon and sentence databases; the lesson planner which uses those databases to select prompts and plan a new lesson; the tutor and student apps which deliver the lesson and record responses and hint levels; and the modules which return completed lessons to the database and update the student model based on lesson performance.

FIG. 2 shows a lesson planning and delivery cycle according to various embodiments of the present invention. As shown in this exemplary cycle, at the start of the cycle concepts are selected for the next lesson. Next, the lesson is delivered using the tutor and student interfaces that allow the tutor to record each student response as well as the hint level needed to elicit that response from the student. Finally, the student responses and associated hint levels are used to calculate new probabilities for the student model, and the student model is updated for use in planning the student's next lesson.

Figure 6:
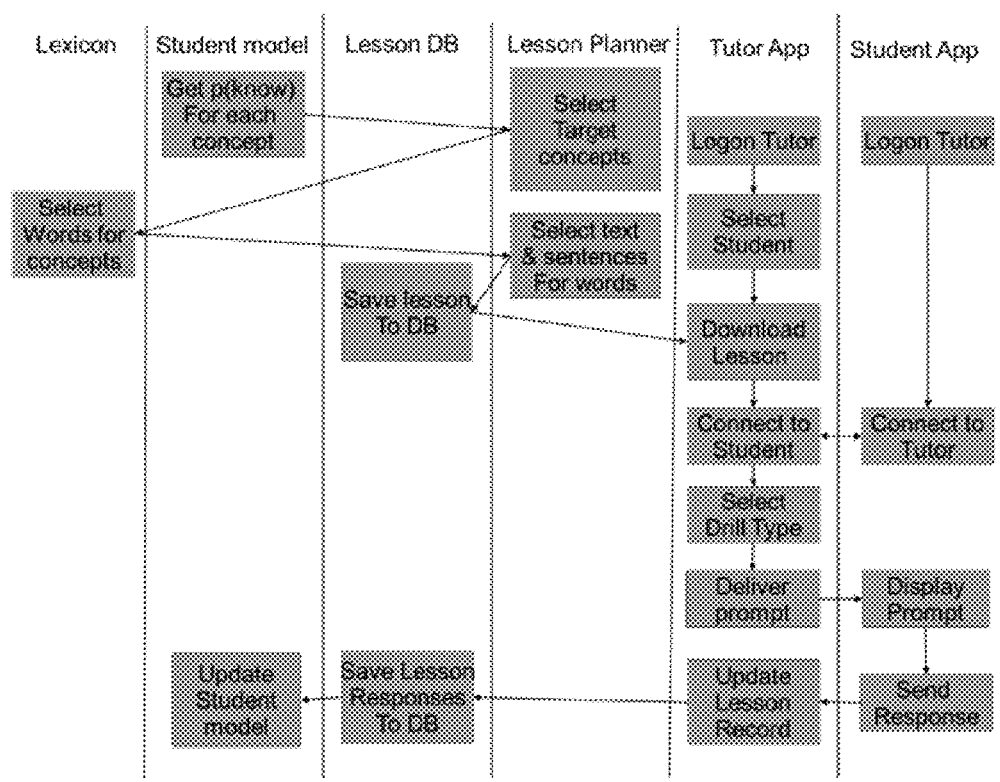

FIG. 6 summarizes the information flow between the various components of the linguistic education systems described herein according to various embodiments of the present invention.

DESCRIPTION

Figure 1:
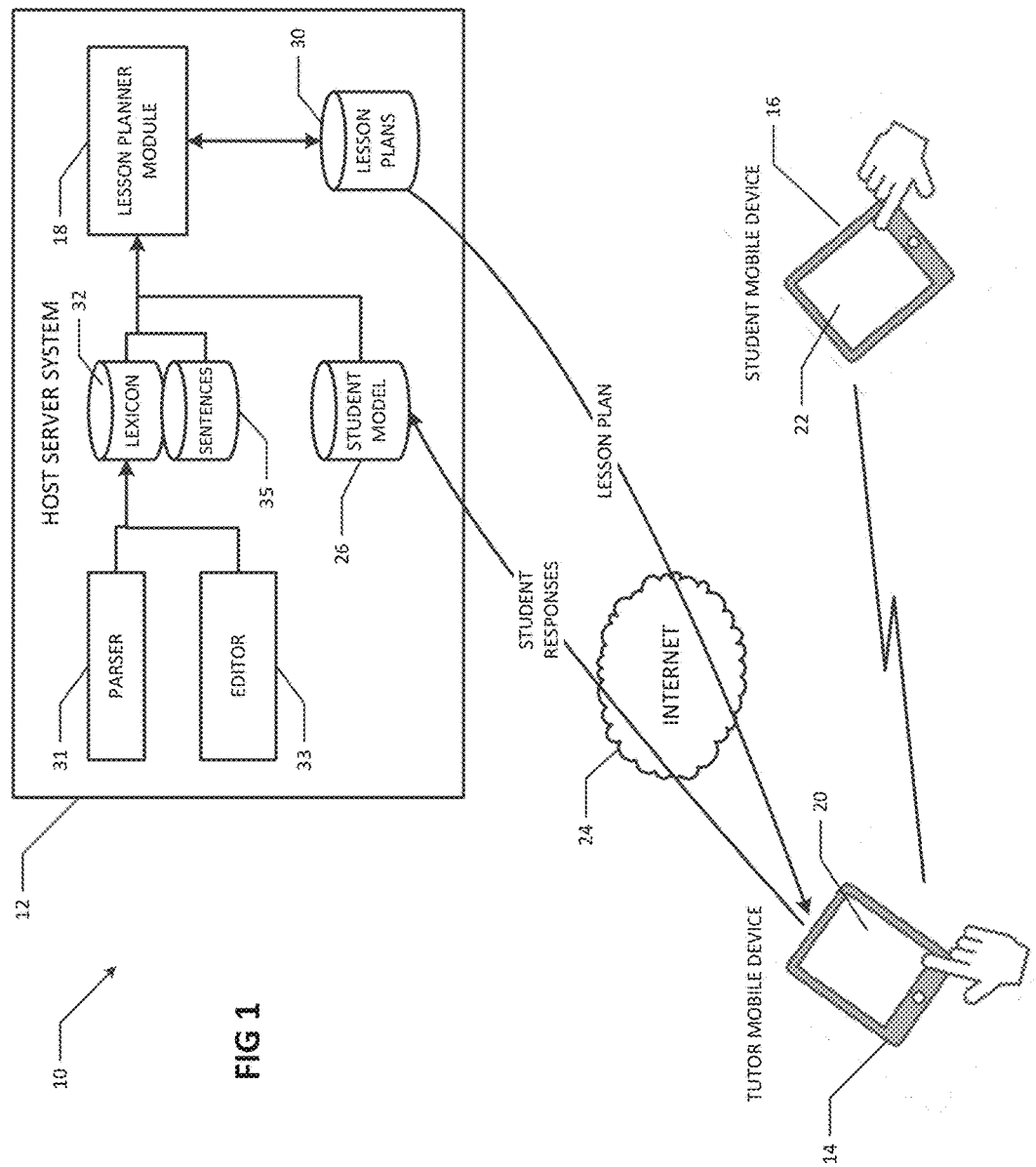

FIG. 1 is a diagram of one possible system architecture for a computer-based education system 10 for assisting in the teaching of linguistic concepts, according to various embodiments of the present invention. As shown in FIG. 1, the system 10 may comprise a host server system 12 as well as tutor and student mobile devices 14, 16. The host server system 12 may be implemented to run on one or more computer servers and may include databases for storing the teaching concepts, student information, lesson plans, words and sentences, as described further below. The host server system 12 may also include a Lesson Planner module 18. The tutor and student mobile devices 14, 16 preferably have touchscreen interfaces 20, 22 and wireless connectivity capability. For example, the tutor and student mobile devices 14, 16 could be implemented as tablets, laptops or smartphones. As explained further below, the tutor mobile device 14 may download a lesson plan from the host server system 12 via the Internet 24 or other suitable electronic data network. The tutor mobile device 14 can connect to the Internet 24 via a WiFi network, for example, that has a wireless access point and router (not shown). During the lesson, in various embodiments, as explained further below, the tutor mobile device 14 and the student mobile device 16 are in communication, either via a wireless or wired connection, so that the tutor can send prompts and receive responses entered by the student on his/her mobile device 16. Bluetooth, NFC or WiFi connections could be used for wireless connections and an Ethernet or USB cable could be used for a wired connection between the two, for example. In other embodiments, as described further below, the tutor and student may use the same device, such as a mobile device, for the lesson.

In various embodiments, the tutor mobile device 14 does not need to be connected to the host server system 12 during the administration of the lesson. For example, the tutor mobile device 14 could download the lesson from the host server system 12 and then go "offline" when administering the lesson to the student. After the lesson is over, the tutor could then go back online to upload the student responses to the host server system 12.

According to various embodiments, the host server system 12 maintains a Student Model database 26 which stores, for each student entered in the system, probabilities that the student knows each teaching concept "i" in the scope and sequence of teaching concepts. This probability is referred to herein as "p(know)$_i$".

The lessons can be designed to impart specific teaching concepts. Types of teaching concepts can include (i) Lexeme-Phoneme relationships, (ii) Morpheme-Meaning relationships, (iii) the relationships between syllable types and pronunciation, and (iv) relationships between positional word features and pronunciations, among other things. As used herein, "lexeme" means a contiguous span of letters within a word which corresponds to a particular sound or "phoneme". A phoneme may be considered an abstraction of the physical speech sounds, i.e., the phones, and may encompass several different phones. Thus, one "lexeme-phoneme" relationship that could be a teaching concept for a particular student is that the letters "ai" produce the sound associated with a long "A", as in the word "rain."

One example of a "morpheme-meaning" teaching concept is how the prefix "un-" changes the meaning of "used" in the word "unused." "Morpheme" refers to those parts of words which carry meaning, such as Latin prefixes, suffixes and roots, as well as Greek combining forms.

One example of a "Syllable Type-Pronunciation" teaching concept is that the vowel in an "open" syllable makes its "long" sound. For example, the first syllable in the word "mo-tor" is open, so the O is long. However, the first syllable in the word "mod-em" is closed, so the O is short. Syllable types include "open," "closed," "vowel-team," "magic-E," "consonant-LE" and "R-controlled."

Examples of "positional word feature" teaching concepts include spelling rules and some pronunciation rules. Spelling rules include using "c" to spell the |k| sound when it appears before the vowels "a", "o", or "u". Positional word feature pronunciation rules include the "magic E" rule, which causes the "o" in "rope" to be long, because of the (non-contiguous) silent E at the end.

The Lesson Planner module 18 of the host server system 12 may plan each new lesson for a student using information from the current Student Model for that particular student. The lesson planner module 18 can algorithmically choose a set of concepts to be included in the lesson based on the student's p(know) for each concept, which is stored in the student model database 26. Next, the Lesson Planner module 18 may select words and sentences to be included in the lesson. These words and sentences can be selected to include the lesson concepts chosen in the previous step, while excluding teaching concepts that are unknown to the student (based on the probabilities in the student model).

In response to the tutor requesting a lesson for a particular student from the host server system 12, the lesson planner module 18 may generate a lesson plan, which can be stored in a lesson plan database 30 for delivery by the host computer system 12 to the tutor mobile device 14 via a network connection, such as the Internet 24. Further, following or during the lesson, the tutor mobile device 14 may upload the student's responses captured by the tutor mobile device 14 during the lesson back to the host server system 12, which may record the student scores and use them to make updates to the Student Model. The updated Student Model for the student can then be used to plan the student's next lesson.

The host server system 12 may also include a Lexicon database 32 as shown in FIG. 1, which can contain a large set of indexed words. These words may be parsed to identify the relationships between spans of letters and various teaching concepts. The words and concepts may then be indexed so the host server system 12 can search for words containing desired teaching concepts. In one embodiment, there are four main parse types in the Lexicon, corresponding to the teaching concept types described above:

Parse Type 1 identifies lexeme-phoneme relationships.

Parse Type 2 identifies morphological features.

Parse Type 3 identifies syllable structures.

Parse Type 4 identifies positional features.

An example of lexeme-phoneme teaching concepts which may be found in Parse Type 1 is shown in Table 1:

TABLE 1

| Lexeme | Phoneme |
|--------|---------|
| W | W |
| i | I |
| nd | Nd |
| ow | oU |

In this example the parser has identified four different teaching concepts in the word "window." For example, the fourth concept shown is the relationship between the lexeme "ow" and the phoneme |oU| (Ō), indicating that, in this word, "ow" makes the long O sound.

As shown in FIG. 1, the host server system 12 may also include a parser 31, a parse editor 33, and a sentence database 35. The parser 31 is an executable software application take as input a linguistic resource such as the freely available Moby Pronunciator database. For each word in that resource the parser 31 determines the lexeme-phoneme relationships, morphemes, syllable types and non-contiguous features present in that word. The lexicon database 32 then stores each parsed word along with the resulting concepts discovered in it. The lexicon database 32 is searchable for each of these concept types, or any combination of them. For example it can be used to find words in which "ow" makes the long O sound, and which also have the "-ing" suffix ("snowing, growing"). The parse editor 33 is an executable software application that can then be used to view and correct individual word parses created by the parser 31. The sentence database 35 stores sentences and connected texts which have been generated for use in lessons. These sentences and texts can be searched to find those containing the particular set of teaching concepts required for the current lesson.

Figure 2:
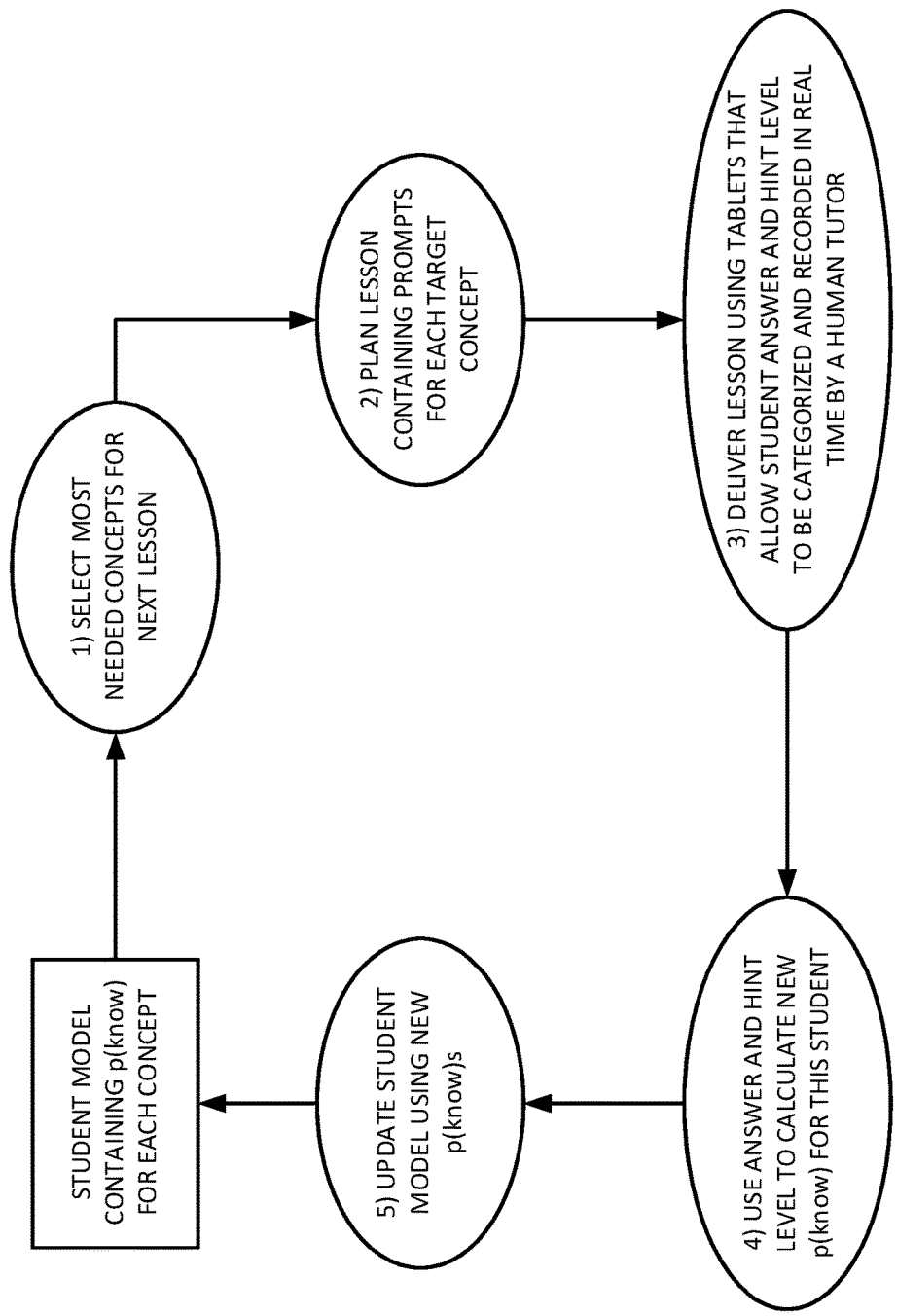

FIG. 2 illustrates a general process of the student-customized linguistic training method implemented according to various embodiments. For each student, the Student Model (shown at top left) stores the probability that the student knows each teaching concept (p(know)$_i$ for each concept i. Based on these probabilities, at Step 1, the lesson planner module selects the most needed concepts for the student's next lesson. At Step 2, the lesson planner module 18 (see FIG. 1) generates the lesson by choosing, among other things, prompts for each concept that has been selected for the lesson. Then, at Step 3, the lesson is downloaded to the tutor's mobile device 14. The tutor can then step through each prompt in the lesson, causing the prompt, in some implementations, to appear on, or be heard on, the student's mobile device 16. Student responses are then, in some implementations, transmitted back to the tutor's device 14 and recorded. The tutor's mobile app has a mechanism, described further below, for recording whether the student needed a hint to answer each prompt properly and, if a hint was needed, the level of hint that was required. After the lesson is completed, the tutor can upload the answer and hint-level for each prompt in the lesson so that, at Step 4, the student's probabilities of knowing the various teaching concepts can be re-calculated. In Step 5, the student model 26 can be updated with the new probabilities. More details regarding embodiments of each of these steps are provided below.

The tutor mobile device 14 includes the tutor app, as mentioned above. The app is a software program on the tutor mobile device 14 that is executed by the processor(s) of the tutor mobile device 14 in order to provide the tutoring functionalities described herein. To administer a lesson to a student, the tutor logs in via the tutor app, selects the desired student and downloads that student's lesson from the host server system 12. The student also logs into a student app running on the student mobile device 16. The tutor and student devices 14, 16 can then contact each other to establish a session, with either a wireless or wired connection between them.

In one embodiment, nine different drill types may be generated by the lesson planner: Auditory, Visual, Blending, Single Word (for reading and spelling), Sentences (for reading and spelling) and Connected Text (for reading and spelling).

Figure 3:
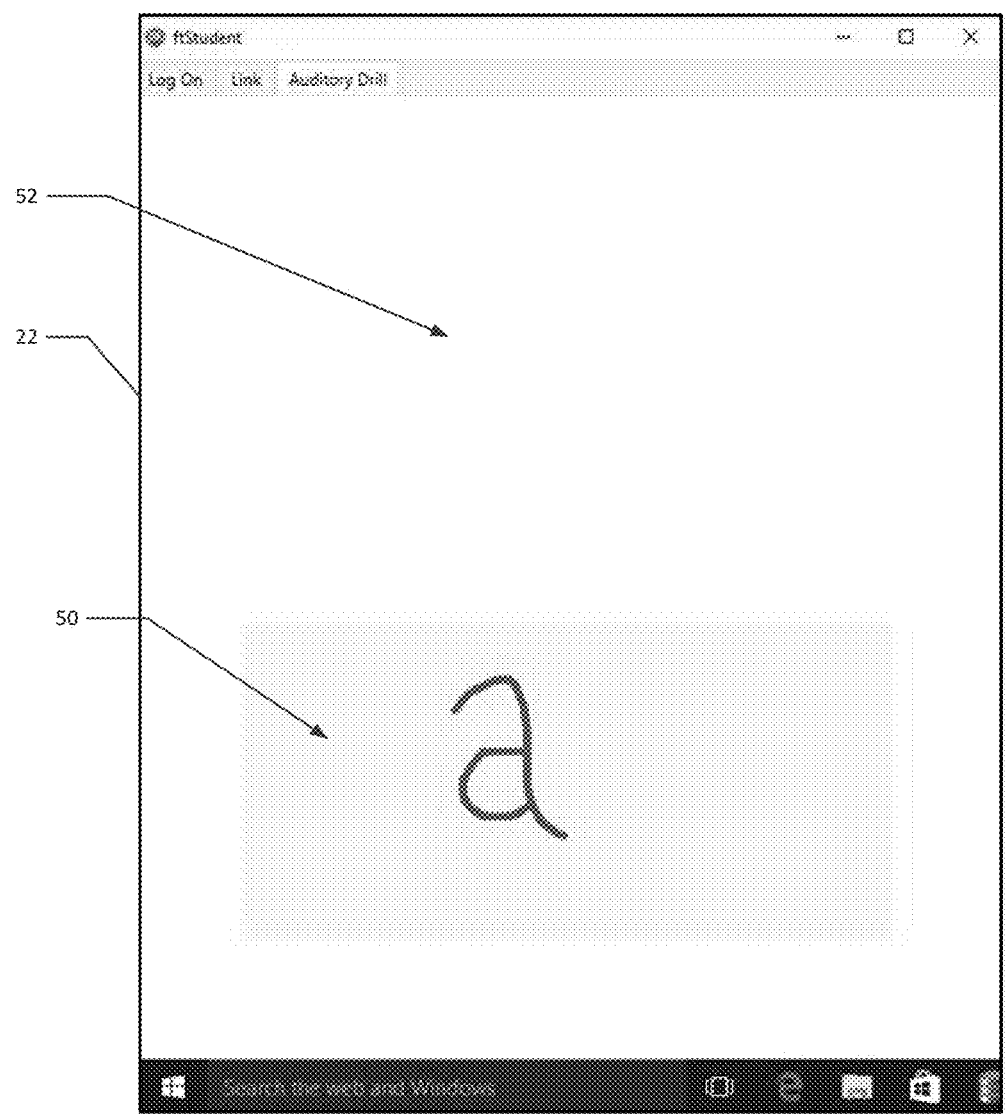
FIG. 3 depicts a screenshot provided by the student app according to various embodiments of the present invention, showing a response area in which the student can write responses to, for example, auditory phoneme prompts.

In an "Auditory Drill" the tutor, based on cues provided by the tutor app for the lesson, may say a phoneme prompt aloud to which the student responds by writing the letter or letters for that sound on the touchscreen interface 22 of the student's mobile device 16, as shown in FIG. 3. The student app captures and recognizes the student's written input on the touchscreen interface 22 so that the student device 16 may transmit data corresponding to the student's response back to the tutor device/app in real time so that the tutor can record whether the student's response is correct and/or the hint level that was required to elicit the response. The tutor app may include and provide a response categorization grid or field for recording the student's responses and corresponding hint levels, as described further below.

In a "Visual Drill," a letter prompt is displayed for the student on the touchscreen interface 22 of the student device 16 and the student responds by pronouncing the phonemes made by that prompt. The tutor can then record via the response categorization field on the tutor app whether the student made the correct pronunciation and the hint level that was required to elicit the correct response. As mentioned above, if the student and tutor are in the same room, the tutor can directly hear the student's response in order to record it in the response categorization field. If the student and tutor are remote, the student can record his/her audible response as one or more audio files using the sound recording capabilities of the student device 16 and transmit that audio file(s) to the tutor device 14. The tutor can then play the audio file(s) using the audio playing capabilities of the tutor device 14 in order to hear the student's response so that the response can be recorded in the response categorization field.

In a "Blending Drill," a sequence of lexemes is presented visually to the student on the student app and the student responds by pronouncing audibly the phoneme for each individually, then blending them together to make an audible pseudo-word. In one embodiment, the student may swipe through all the letters displayed on the touchscreen 22 of the student device 16 while audibly blending their sounds together. The tutor can record, via the response categorization area on the tutor app, the correctness of the student's audible response and the hint level that was required to elicit it.

In a "Single Word" drill, the prompts are words shown visually in the student app (e.g., displayed on the touchscreen 22), to which the student responds audibly by reading the entire word aloud. The instructor uses the response categorization area on the tutor app to score the student's response by marking the hint level required for each of the teaching concepts contained in each word.

In a "Sentences" drill, the student is presented visually with a group of words in the student app (e.g., displayed on the touchscreen 22). The student reads each word in the group aloud, and each word is scored by the tutor in the same way as a Single Word Drill.

In a "Text" drill, the prompt is a connected text consisting of several sentences that is displayed on the touchscreen 22 in the student app, to which student responds by reading each word aloud. The tutor listens and marks hint levels for each word, exactly as in Sentence Drill.

Figure 4:
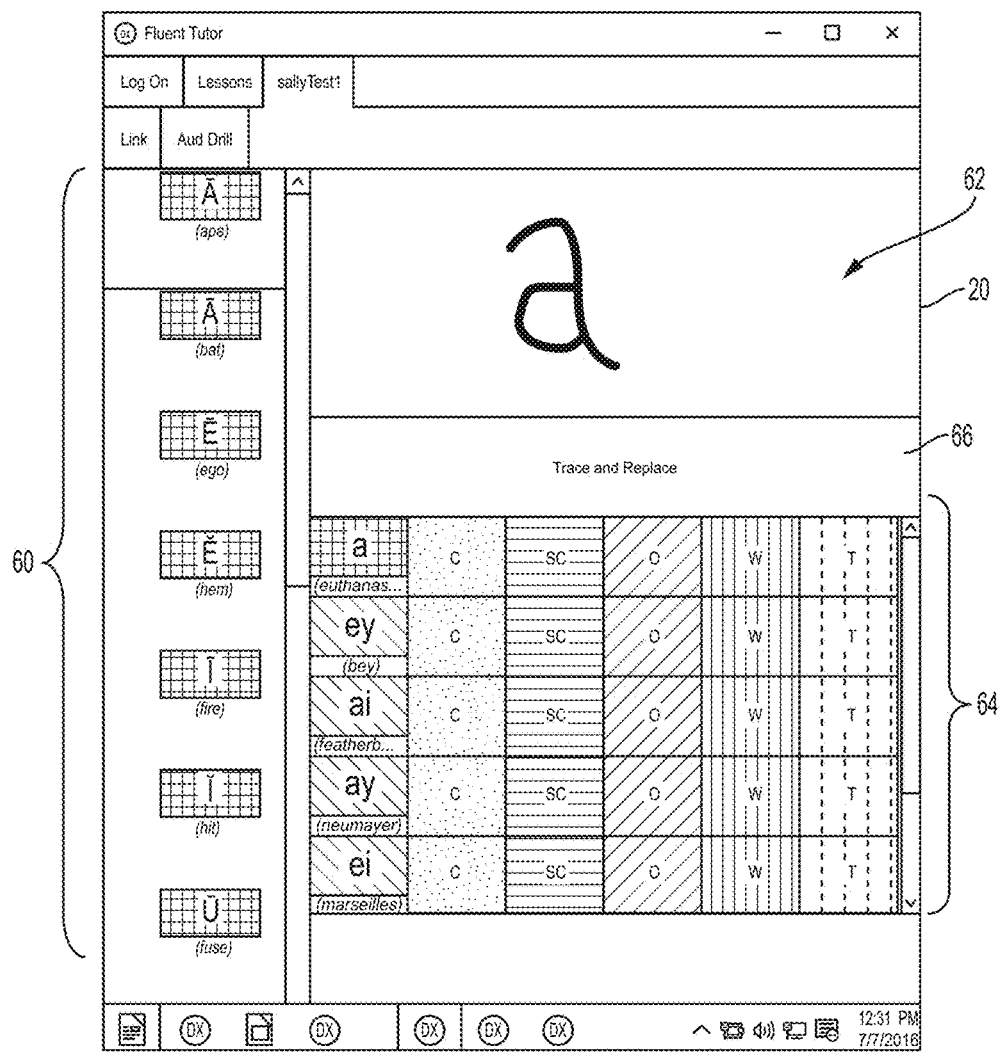
FIG. 4 depicts a screenshot provided by the tutor app according to various embodiments of the present invention, showing an exemplary response categorization grid by which tutors can quickly record student responses as well as the hint levels that were necessary to elicit those responses from the student during the administration of a lesson.

FIG. 3 is an example display provided by one embodiment the student app that runs on the student device 16 and FIG. 4 is an example display correspondingly provided by one embodiment of the tutor application that runs on the tutor device 14. The student app and tutor app may be run on different devices 14, 16 that are connected to each other (i.e., in communication) as described above. These apps may also connect through the Internet 24 such as when the mobile devices 14, 16 are located remote from each other, allowing a tutor and a student to interact from distant locations. In another embodiment, the apps can run on the same device, each using a different portion of the graphical display. In such a "single-device" embodiment, the student app may be displayed upside down on the device's display screen in relation to the tutor app because instructors and students typically face each other across a table.

As shown in FIG. 3, the student app interface may contain a plurality of tabs that the student can select to access various functionalities provided by the student app. These may include (i) a logon tab, used to identify and validate the user/student (shown as "Logon" in FIG. 3); (ii) a link tab that, when selected, allows the user/student to start and monitor the connection to the tutor app; and (iii) a series of drill type tabs. There will be one drill type tab for each drill in the selected lesson, however, FIG. 3 shows only a tab for "Auditory Drill" by way of example. In the embodiment of FIG. 3, the tabs are at the top left of the screen.

The student app interface shown in FIG. 3 has a text input area 50 where the student can write responses, with a stylus or finger, on the touchscreen interface 22 of the student mobile device 16, which written responses can be captured by the touchscreen interface 22. The student app also has a text display area 52, in which visual prompts such as lexemes, words and sentences may be displayed.

As shown in FIG. 4, the tutor app interface may also include a plurality of tabs that the tutor can select to access various functionalities provided by the tutor app. These may include, as shown in the example of FIG. 4, (i) a "Logon" tab, used to identify and validate the user/tutor; (ii) a "Lessons" tab, used to upload and download lessons to and from the host server system 12, and to select a lesson from those that have been downloaded to the tutor device 14, to be used for the current tutoring session; (iii) a current lesson tab (shown as "SallyTest1" in FIG. 4) that holds various subtabs for the selected lesson; (iv) a "Link" tab which allows the user to start and monitor the connection to the student app; and (v) a series of drill type tabs. There will be one drill type tab for each drill in the selected lesson. In the example of FIG. 4, only an Auditory drill ("Aud Drill") type is shown. Each drill type tab shown in the tutor app interface may contain elements for the corresponding drill as described below.

Each drill type tab in the tutor app may have a prompt display area 60. In the embodiment shown in FIG. 4, the prompt display area 60 is in a scroll box on the left of the tutor app interface. The prompt display area 60 allows the instructor to scroll down through each prompt included in that drill portion of the lesson. As the tutor selects each prompt, it is displayed on the student app (if it is a visual prompt), or should be spoken aloud by the tutor (if it is an auditory prompt).

Each drill type tab in the tutor app may also have a script input area 62, which communicates with a similar script input area 50 in the student app. The student may respond to the tutor's prompt by writing in the student app script input area 50 with a finger or a stylus. The student device touchscreen interface 22 captures the student's written input and transmits one or more files with data indicative of that input to the tutor app/device, so that the tutor app/device can display the student's written input in the corresponding script input area 62 of the tutor app/device. In the examples of FIG. 3 and FIG. 4, the student responded to a prompt by writing the letter "a," which is mirrored to the tutor app in input area 62. The connection between the tutor and student apps is preferably two-way. If helpful as part of the lesson, writing may be added by the tutor in the tutor app's script input area 62, perhaps to complete or correct a letter or word, and this writing will be captured by the tutor device/app and transmitted back to the student app/device and displayed in the student app's script input area 50.

Each drill type tab in the lesson may also have a "response categorization area" 64, which displays acceptable responses for the currently selected prompt. In the embodiment of FIG. 4, the response categorization area 64 is shown in the center of the tutor app interface, below the "Trace and Replace" button 66. The response categorization area 64 allows an instructor to quickly record a student's response along with the hint level which may have been necessary to elicit that response.

In the example of FIG. 4, the current prompt is the long "A" sound, as shown by the highlighted concept in FIG. 4. Appropriate responses consisting of leximes that make that sound are listed, in this example, on the left-hand side of the response categorization area 64, in this example "a", "ey", "ai", "ay" and "ei." Horizontally next to each response in the input categorization area 64, in a grid-like fashion, is shown a series of buttons representing the various hints that may have been needed to elicit this response. In one embodiment, selectable hints may include:

C, which stands for "correct" (e.g. a student answers correctly the first time);

SC, which stands for "self-correct" (e.g. a student answers incorrectly but self-corrects quickly, within approximately 1 second after the hint);

O, which stands for "other" (e.g. a student answers correctly after the instructor gives an "anything else?" hint);

W, which stands for "word" (e.g. a student answers correctly after the instructor gives an example word hint, such as "what makes the |$\overline{\text{A}}$| sound in 'rain'?"); and T, which stands for "tell" (e.g. an instructor simply gives the correct answer to the student).

Figure 5:
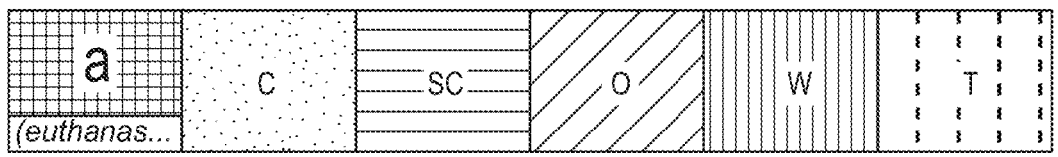
FIG. 5 shows detail of the response categorization grid from FIG. 4 according to various embodiments of the present invention.

An example of these hint buttons is shown in detail in FIG. 5. In the example of FIG. 5, the expected response is "a," which is one of the appropriate responses to the example auditory prompt, which asks for all lexemes which make the long A sound. The tutor may note both that the "a" response was given, and what hint level was necessary to extract that response, by clicking on the corresponding hint level button shown by the tutor app on the touchscreen interface 20 of the tutor device 14. If the student immediately gives one of the correct responses, the tutor may press the "C" button in the row of the grid 64 next to that response. If the student gives a wrong response, but immediately corrects it, the tutor may press the "SC" button next to that response. If the student stalls out after a couple of correct responses, but thinks of a correct answer after an "anything else?" or similar prompt from the tutor, the tutor presses the "O" button next to that response. If the student stalls out and an "other" prompt doesn't help, the tutor may give an example word, e.g. "what makes the long A sound in 'acorn?'" If this results in a correct response, the tutor may press the "W" button for the corresponding response. If none of the hints enable the student to provide an acceptable response, and the student has to be told the answer, the instructor may press the "T" button to record that a "tell" prompt was necessary.

In other embodiments the specific set of hint levels displayed can be changed to fit instructor preferences using configuration file settings. Any set of hints and hint-weights can be used.

The prompt and response type handled by the tutor and student apps may vary according to the drill type that is being presented to the student. For example, prompt and response types may differ between auditory, visual, word, sentence and blending drills, as described below.

In one embodiment, for an auditory drill, which is the drill type illustrated in the screenshots of FIGS. 3 and 4, prompts may be a phoneme spoken by the tutor while responses are lexemes, which may be written by the student (or otherwise received via a drop down selection, radial button, etc.) in an appropriate location in the student app, such as the script input area 50 (see FIG. 3) described above. The lexeme response may be mirrored in the tutor script box 62 of the tutor app. In this drill type, the response categorization area 64 allows recognizing each legal lexeme response from the student, and marking it for the hint level that had been necessary to elicit it.

In one embodiment, for a visual drill, prompts are lexemes that are selected by the tutor and displayed as text in the student app (e.g., in the text display area 52). Responses are phonemes, spoken by the student. In this drill type, the response categorization area 64 allows recognizing each legal phoneme response from the student, and marking it in the response categorization area 64 of the tutor app interface for the hint level that had been necessary to elicit it.

For single word reading drill types, the prompts may be printed words that are selected by the tutor from the prompt list and shown to a student in the student app (e.g., in the text display area 52). Responses may be spoken words and the input categorization area 64 of the tutor app may contain each lexeme-phoneme relationship contained in the target word. This allows the tutor to indicate exactly where in the word the student faltered with their response along with the hint level that was needed to elicit the correct answer. For example, if a prompt was "window," the response categorization area would preferably have four rows labeled: "w-|W|", "i-|I|", "nd |Nd|" and "ow-|oU|." These four rows would look like those in FIG. 4, but with the mentioned labels instead of "a" "ey," "ai," "ay," etc. In this drill type, the response categorization area 64 allows recognizing each legal lexeme-phoneme response pair within the word, and marking it for the hint level that had been necessary to elicit it.

For single word writing drill types, the prompts are spoken words and responses are words written in the student script input area 50 of the student app. The written word responses may be mirrored in the tutor script area 62 of the tutor app. In this drill type, the response categorization area 64 allows recognizing each legal lexeme-phoneme response within the word, and marking it for the hint level that had been necessary to elicit it, similar to single word reading described above.

For sentence and text reading drill types, prompts may be visual sentences or text that is selected by the tutor. The visual sentences or text may be displayed on both the tutor and student apps. Responses are spoken words that are received as the student reads the text. The tutor app interface displayed on the touchscreen 20 may allow the tutor to tap a word in the prompt sentence or text, upon which that word's constituent lexeme-phoneme pairs are shown in the input categorization area 64, exactly as for single word prompts. In this drill type, the response categorization area 64 allows recognizing each legal lexeme-phoneme response within the selected word, and marking it for the hint level that had been necessary to elicit it.

For sentence and text spelling drill types, prompts are sentences or text displayed only on the tutor app, which are then read aloud by the tutor. The student responses may be sentences or text written in the student script input box 50 (or otherwise selected via drop downs, radial buttons, etc.). According to one embodiment, if the student misses a word, the tutor may tap that word in the prompt text shown on the tutor app, whereupon that word's lexeme-phoneme pairs are shown in the input categorization area 64, as in to the other word drill types described above. In this drill type, the response categorization area 64 allows recognizing each legal lexeme-phoneme response within the selected word, and marking it for the hint level that had been necessary to elicit it.

For blending drill types, prompts are sets of N lexemes, selected in sequences that are acceptable in English, but which do not form a word. The prompt may be selected by the tutor from a list (similar to single words) and the student may be shown one lexeme at a time in the student app (e.g., area 52). Responses are spoken phonemes. According to embodiment, the student may pronounce each phoneme as its lexeme prompt appears on the student app interface and then the student may speak them all at once, blended as a pseudo-word. The tutor's input categorization area 64 may display a row for each lexeme-phoneme pair in the blend, the same or similar to single word reading. In this drill type, the response categorization area 64 allows recognizing each legal lexeme-phoneme response within the blend, and marking it for the hint level that had been necessary to elicit it.

After all responses in a lesson have been received and categorized, the final steps in the Lesson Planning and Delivery cycle are calculating the new set of p(know) values and updating the student model for the student. These steps are shown as Steps 4 and 5 in FIG. 2. In these steps, the Student Model for the student may be updated using the hint levels assigned to each response in the response categorization area 64 by the tutor. That is, the tutor app can capture the tutor's scoring of the students' responses for the various drill prompts, and data indicative of those scores is uploaded from the tutor device 14 to the host server system 12. In updating the student model, the host server system 12 considers that the student's knowledge is higher if a student reaches the correct answer in response to a lower hint level (for example where the categorization of the response is "C" or "SC") than in response to a higher hint level (for example where the categorization of the response is "W" or "T"). The following formula can be used by the host server system 12 to calculate a student's p(know) for each concept:

$$p(\text{know})_i^d = \frac{\sum_{k=0}^{H} T_k^i W_k}{\sum_{k=0}^{H} T_k^i}$$

This calculates p(know) for concept i and drill type d as the average of the hint value weights, $W_h$, given for each trial T of that concept. The overall p(know) for concept i is then calculated as the weighted average of $p(\text{know})^d_i$ for each drill type d:

$$p(\text{know})_i = \sum_{d=0}^{D} p(\text{know})_d^i W_d$$

This calculates a student's p(know) for concept i as the weighted average of all the drill type p(know)s calculated in the previous step.

In one embodiment, the weights over hints $W_h$, and over drill types $W_d$ can be initially set using expert knowledge. For example, based on previous experience, a tutor may consider that there is more information about a student's state of knowledge in a "C" response than in an "O" response. Accordingly, the tutor may set the hint weights $W_h$, so that "C" hint responses are weighted more heavily than "O" hint responses. Similarly, the tutor may consider that there is more information in auditory drill than, for example in word reading drill. Accordingly, the tutor may set the drill weights $W_d$ so that responses in auditory drill are weighted more heavily than responses in word reading drill. The tutor app can provide an interface for the tutor to set these weights and they can be uploaded to the host server system 12 so that they are used in the calculation of the Student Model.

As lesson data accumulates, $W_h$ and $W_d$ may also be iteratively learned from data and optimized to predict student scores on future lessons. For example, for each concept i, the host server system 12 may collect correctness statistics for a time period t, then experimentally adjust hint and drill type weights for previous time periods. Changing the weights will change the calculated p(know), allowing weights to be found which bring p(know) closest to the observed performance at time t.

FIG. 6 summarizes the information flow among modules of the host server system 12 and the tutor and student devices 14-16, during execution of the lesson planning and delivery steps described above. The Lesson Planner first uses information in the student model to select which concepts to include in the lesson. The selected concepts are used to select candidate words from the lexicon, for possible inclusion in the lesson. The candidate words and concept lists are used to select sentences and texts from their respective databases, and if necessary modify them to fit the lesson. The resulting lesson is downloaded to a tutor app. The tutor app connects to a student app, and uses the connection to send and receive lesson prompts and responses. The responses and their hint levels are categorized and annotated by the tutor, and uploaded back to the Lesson database, where they are used to update the student model.

In general aspect, therefore, the present invention is directed to a linguistic education system 10 for a tutor to provide linguistic instruction to a student. The linguistic education system 10 comprises a host server system 12 that comprises one or more servers and a tutor mobile computing device 14 that is remote from and in communication with the host server system 12 via a data network 24. The one or more servers of the host server system 12 comprise a student model database 26 that stores a student model for the student that indicates, for each of a plurality of linguistic concepts, a likelihood that the student knows the linguistic concept. The one or more servers of the host server system 12 are also programmed to generate a lesson plan for a linguistic lesson for the student, where the lesson plan comprises a set of prompts (e.g., visual prompts) for each of one or more selected linguistic concepts for the lesson. The lesson plan for the student is preferably generated based on the student model for the student The tutor mobile computing device 12 comprises display means with a sensor to detect interaction by the tutor with the display means, such as a touchscreen interface 20, which may be implemented as a LCD display with the capacitive touchscreen, for example. The tutor mobile computing device 12 also executes a software application that, when executed, displays a response categorization area 64 on the touchscreen interface 20 of the tutor mobile computing device 12. The response categorization area 64 comprises a listing of one or more possible responses for a selected prompt that is part of the lesson plan and, for each of the one or more possible responses for the selected prompt, a series of two or more hint level icons that represent varying degrees of hint levels. The hint level icons are selectable by the tutor, via the display means, to record the hint level that was needed to be provided by the tutor to elicit a correct response from the student. The tutor mobile computing device 14, when executing the application, is also caused to transmit back to the host server system 12 student response data indicative of the hint level icons selected by the tutor for each of the one or more possible responses for each prompt in the lesson plan. The one or more servers of the host server system are further programmed to update the student model for the student based on the student response data received from the tutor mobile computing device.

In various implementations, the response categorization area 64 displayed on the touchscreen interface of the tutor mobile computing device comprises a grid where a first column lists the set of prompts for drill of the lesson and rows next to each of the one or more possible responses list the series of two or more hint level icons. The series of two or more hint level icons may comprise: a first hint level icon to indicate a correct initial response by the student; a second hint level icon to indicate that the student self-corrected an initial response within a short time period after providing the initial response; a third hint level icon that indicates that the student responded correctly after a prompt from the tutor for other correct responses; a fourth hint level icon that indicates that the student responded correctly after being given an example word; and a fifth hint level icon that indicates that the student had to be provided the correct response by the tutor.

Also in various implementations, the one or more selected linguistic concepts for the lesson can comprise a lexeme-phoneme relationship or a morpheme-meaning relationship, or other concepts described herein.

The linguistic education system may also further comprise a student mobile computing device 16 that (i) is in communication with the tutor mobile computing device 14 during administration of the lesson via a data link; and (ii) comprises a touchscreen interface 22. In that connection, the lesson could comprise an auditory drill in which the touchscreen interface 22 of the student mobile computing device 16 is for capturing a written response by the student made on the touchscreen interface 22 in response to an audible prompt from the tutor; and the student mobile computing device 16 is further for transmitting to the tutor mobile computing device 14, via the data link, data indicative of the written response by the student captured by the touchscreen interface 22 of the student mobile computing device 16. The lesson could also comprise a drill type in which the touchscreen interface 22 of the student mobile computing device 16 displays textual subject matter for the student. In such a drill type, the response categorization area 64 displayed on the tutor mobile computing device 14 is for receiving the tutor's hint level selection based on the student's verbalization of the textual subject matter displayed on the touchscreen interface 22 of the student mobile computing device 16. The textual subject matter displayed on the student mobile computing device for the drill could be a lexeme, a single word, a single sentence, and a multi-sentence text.

In another general aspect, the present invention is directed to a method for providing linguistic instruction to a student. The method comprises the step of storing, in a student model database 26 of a host server system 12 that comprises one or more servers, a student model for the student that indicates, for each of a plurality of linguistic concepts, a likelihood that the student knows the linguistic concept. The method also comprises the step of generating, by the one or more servers of the host server system 12, a lesson plan for a linguistic lesson for the student, where the lesson plan comprises a drill for each of one or more selected linguistic concepts for the lesson. The method also comprises the step of, prior to administration of the lesson by the tutor to the student, transmitting, by the one or more servers of the host server system 12, the lesson plan to a tutor mobile computing device 14 that is remote from and in communication with the host server system via a data network 24. The method further comprises the steps of, after administration of the lesson: (i) receiving, by the one or more servers of the host server system 12 from the tutor mobile computing device 14 via the data network 24, student response data indicative of hint levels needed by the student for each drill in the lesson, where the tutor records the hint level needed by the student for each drill on the tutor mobile computing device by selecting a corresponding hint level icon displayed on the tutor mobile computing device 14; and (ii) updating the student model for the student based on the student response data received from the tutor mobile computing device 14.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described herein above may be implemented in computer software using any suitable computer programming language such as .NET, SQL, MySQL, HTML, C, C++, Python, and using conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Any software modules described herein, such as the lesson planner module referred to above, may be implemented in one or more computer programs that are written in any suitable computer language, such that when a processor(s) executes the software programs of the modules, the processor(s) is caused to perform the functions of the modules described herein. Suitable processors for the execution of a program of instructions include, by way of example, both general and special purpose microprocessors. Further, any computer component described herein, such as the host server system and the student/tutor devices, can include a single processor or multiple processors. The software of the modules or apps, as the case may be, is stored in, and the processor may receive instructions and data from, primary (e.g., RAM or ROM), secondary (HHD, SSD, flash), tertiary and/or off-line data storage. The program instructions may be embodied in the form of source code that comprises human-readable statements written in a programming language or machine code that comprises numerical instructions recognizable by a suitable execution system such as a processing component in a computer system. The computing devices described above, such as the student and tutor devices, include input devices that vary depending on the characteristics of a particular computing device and its display device. For example, an input device of a mobile device such as the tutor mobile device 14 and/or the student mobile device 16 may comprise one or more of a touch-screen keyboard, a microphone, an integrated camera, a track pad, a scroll wheel, a track ball, a button, and a touch screen display device. The input device for a touch screen interface can be anything capable of interacting with the touch screen, including a user's fingers, which can be used to select, slide, drag, and resize (i.e., expand, maximize, shrink, and/or minimize) interactive user interface ("UI")

elements through pointing, pinching, and scrolling gestures. The touch screen interface may comprise a LCD display with resistive, surface acoustic wave, capacitive, infrared, or other touchscreen sensor technology as appropriate. In embodiments, a capacitive touchscreen may incorporate technology that relies on surface capacitance and/or projected capacitance (e.g., mutual capacitance or self capacitance). In an embodiment using surface capacitance, one side of the insulator (e.g., the backside of the glass display) is coated with conductive material. A small voltage is applied to this layer, resulting in a uniform electrostatic field. When a conductor, such as a human finger, touches the uncoated surface, a capacitor is dynamically formed. Because of the sheet resistance of the surface, each corner is measured to have a different effective capacitance. The sensor's controller can determine the location of the touch indirectly from the change in the capacitance as measured from the four corners of the panel: the larger the change in capacitance, the closer the touch is to that corner.

For a projected capacitance touch (PCT) technology, the top layer is preferably glass and an X-Y grid can be formed either by etching one layer to form a grid pattern of electrodes, or by etching two separate, parallel layers of conductive material with perpendicular lines or tracks to form the grid. Such a PCT can rely on self capacitance or mutual capacitance. Mutual capacitive sensors have a capacitor at each intersection of each row and each column. A 12-by-16 array, for example, would have 192 independent capacitors. A voltage is applied to the rows or columns. Bringing a finger or conductive stylus near the surface of the sensor changes the local electric field which reduces the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time. Self-capacitance sensors can have the same X-Y grid as mutual capacitance sensors, but the columns and rows operate independently. With self-capacitance, current senses the capacitive load of a finger on each column or row. This produces a stronger signal than mutual capacitance sensing, but it is unable to resolve accurately more than one finger, which results in "ghosting", or misplaced location sensing It will be appreciated that those skilled in the art will be able to devise various arrangements which, although not explicitly described or shown herein, embody the principles of the present invention and are comprised within the scope thereof. Furthermore, all examples and conditional language recited herein are principally intended to aid the reader in understanding the principles described in the present invention and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present invention, therefore, is not intended to be limited to the exemplary aspects and aspects shown and described herein.

What is claimed is:

1. A linguistic education system for a tutor to provide linguistic instruction to a student, the linguistic education system comprising:
   a host server system that comprises one or more servers;
   a tutor mobile computing device that is remote from and in communication with the host server system via a data network; and
   a student mobile computing device,
   wherein:
      the one or more servers of the host server system:
         comprise:
            a lexicon database that stores a set of multiple words, wherein each word in the lexicon database is indexed to one or more linguistic concepts;
            a sentence database that stores sentences, wherein the sentences use words in the lexicon database;
            a student model database that stores a student model for the student, wherein the student model for the student indicates, for each of a plurality of linguistic concepts, a probability that the student knows the linguistic concept;
         is programmed to generate a lesson plan for a linguistic lesson for the student, wherein the lesson plan comprises one or more drills for one or more selected linguistic concepts to be covered in the linguistic lesson, wherein the one or more selected linguistic concepts for the linguistic lesson are selected based on a probability that the student knows the one or more selected linguistic concepts based on the student model, wherein the one or more drills comprise prompts, wherein the prompts comprise word prompts and sentence prompts, wherein words for the word prompts and sentences for the sentence prompts are selected for the linguistic lesson from the lexicon database and the sentence database based on the words in the word prompts and words in the sentences in the sentence prompts being indexed to the one or more selected linguistic concepts in the linguistic lesson, such that words and sentences that are unknown to the student, based on the student model for the student, are excluded from the lesson plan;
      the tutor mobile computing device:
         comprises a touchscreen interface; and
         executes a software application that, when executed:
            displays a response categorization area on the touchscreen interface of the tutor mobile computing device, wherein the response categorization area comprises:
               a listing of one or more possible responses for a selected prompt that is part of the linguistic lesson plan; and
               for each of the one or more possible responses for the selected prompt, a series of two or more hint level icons that represent varying degrees of hint levels, and wherein the hint level icons are selectable by the tutor, via the touchscreen interface of the tutor mobile computing device, to record the hint level that was needed to be provided by the tutor to elicit a correct response from the student; and
            transmits back to the host server system student response data indicative of the hint level icons selected by the tutor for each of the one or more possible responses for each prompt in the lesson plan;

the student mobile computing device that is remote from and in communication with the tutor mobile computing device during the linguistic lesson, and wherein the student mobile computing device comprises a touch screen interface, such that for a portion of the linguistic lesson where the student inputs a response to a prompt from the tutor via the touch screen interface of the student mobile computing device, the student's response is displayed during the linguistic lesson on the touchscreen interface of the tutor mobile computing device, and the one or more servers of the host server system are further programmed to update the student model for the student based on the student response data received from the tutor mobile computing device.

2. The linguistic education system of claim 1, wherein the response categorization area displayed on the touchscreen interface of the tutor mobile computing device comprises a grid, wherein the grid comprises:
a first column that lists the one or more possible responses for a selected drill of the lesson plan; and
in rows next to each of the one or more possible responses, the series of two or more hint level icons.

3. The linguistic education system of claim 2, wherein the series of two or more hint level icons comprises a first hint level icon to indicate a correct initial response by the student.

4. The linguistic education system of claim 3, wherein the series of two or more hint level icons comprises a second hint level icon to indicate that the student self-corrected an initial response within a short time period after providing the initial response.

5. The linguistic education system of claim 4, wherein the series of two or more hint level icons comprises a third hint level icon that indicates that the student responded correctly after a prompt from the tutor for other correct responses.

6. The linguistic education system of claim 5, wherein the series of two or more hint level icons comprises a fourth hint level icon that indicates that the student responded correctly after the tutor provided an example word prompt.

7. The linguistic education system of claim 6, wherein the series of two or more hint level icons comprises a fifth hint level icon that indicates that the student had to be provided the correct response by the tutor.

8. The linguistic education system of claim 1, wherein the touchscreen interface of the tutor mobile computing device comprises a capacitive touchscreen with a LCD display.

9. The linguistic education system of claim 1, wherein the one or more selected linguistic concepts for the lesson comprise a lexeme-phoneme relationship.

10. The linguistic education system of claim 9, wherein the one or more selected linguistic concepts for the lesson further comprises a morpheme-meaning relationship.

11. The linguistic education system of claim 1, wherein the one or more selected linguistic concepts for the lesson comprise a linguistic relationship selected from the group consisting of:
a lexeme-phoneme relationship;
a morpheme-meaning relationship;
a relationship between a syllable type and pronunciation; and
a relationship between a positional word feature and pronunciation.

12. The linguistic education system of claim 1, wherein:
the linguistic lesson comprises an auditory drill in which the touchscreen interface of the student mobile computing device is for capturing a written response by the student made on the touchscreen interface of the student mobile computing device in response to an audible prompt; and
the student mobile computing device is further for transmitting to the tutor mobile computing device data indicative of the written response by the student captured by the touchscreen interface of the student mobile computing device.

13. The linguistic education system of claim 1, wherein:
the linguistic lesson comprises a drill type in which the touchscreen interface of the student mobile computing device displays textual subject matter for the student; and
the response categorization area displayed on the tutor mobile computing device is for receiving the tutor's hint level selection based on the student's verbalization of the textual subject matter displayed on the touchscreen interface of the student mobile computing device.

14. The linguistic education system of claim 13, wherein the textual subject matter displayed on the student mobile computing device comprises textual subject matter selected from the group consisting of a lexeme, a single word, a single sentence, and a multi-sentence text.

15. The linguistic education system of claim 1, wherein:
the tutor mobile computing device comprises a tablet computer; and
the student mobile computing device comprises a tablet computer.

16. A linguistic education system for a tutor to provide linguistic instruction to a student, the linguistic education system comprising:
a host server system that comprises one or more servers;
a tutor mobile computing device that is remote from and in communication with the host server system via a data network; and
a student mobile computing device,
wherein:
the one or more servers of the host server system:
comprise:
a lexicon database that stores a set of multiple words, wherein each word in the lexicon database is indexed to one or more linguistic concepts;
a sentence database that stores sentences, wherein the sentences use words in the lexicon database;
a student model database that stores a student model for the student, wherein the student model for the student indicates, for each of a plurality of linguistic concepts, a probability that the student knows the linguistic concept;
is programmed to generate a lesson plan for a linguistic lesson for the student, wherein the lesson plan comprises one or more drills for one or more selected linguistic concepts to be covered in the linguistic lesson, wherein the one or more selected linguistic concepts for the linguistic lesson are selected based on a probability that the student knows the one or more selected linguistic concepts based on the student model, wherein the one or more drills comprise prompts, wherein the prompts comprise word prompts and sentence prompts, wherein words for the word prompts and sentences for the sentence prompts are selected for the linguistic lesson from the lexicon database and the sentence database based on the words in the word prompts and words in the sentences in the sentence prompts being indexed to the one or more selected linguistic concepts in the linguistic lesson, such that words and sentences that are unknown to the student, based on the student model for the student, are excluded from the lesson plan;

the tutor mobile computing device:
 comprises display means with a sensor to detect interaction by the tutor with the display means; and
 executes a software application that, when executed:
  displays a response categorization area on the display means of the tutor mobile computing device, wherein the response categorization area comprises:
   a listing of one or more possible responses for a selected prompt that is part of the lesson plan; and
   for each of the one or more possible responses for the selected prompt, a series of two or more hint level icons that represent varying degrees of hint levels, and wherein the hint level icons are selectable by the tutor, via the display means, to record the hint level that was needed to be provided by the tutor to elicit a correct response from the student; and
  transmits back to the server student response data indicative of the hint level icons selected by the tutor for each of the one or more possible responses for each prompt in the lesson plan;

the student mobile computing device that is remote from and in communication with the tutor mobile computing device during the linguistic lesson, and wherein the student mobile computing device comprises a touch screen interface, such that for a portion of the linguistic lesson where the student inputs a response to a prompt from the tutor via the touch screen interface of the student mobile computing device, the student's response is displayed during the linguistic lesson on the touchscreen interface of the tutor mobile computing device; and the one or more servers of the host server system are further programmed to update the student model for the student based on the student response data received from the tutor mobile computing device.

17. A method for providing linguistic instruction to a student, the method comprising:

storing, in a student model database of a host server system that comprises one or more servers, a student model for the student, wherein the student model for the student indicates, for each of a plurality of linguistic concepts, a probability that the student knows the linguistic concept;

storing, in a lexicon database of the host server system, a set of multiple words, wherein each word in the lexicon database is indexed to one or more linguistic concepts;

storing, in a sentence database of the host server system, sentences, wherein the sentences use words in the lexicon database;

generating, by the one or more servers of the host server system, a lesson plan for a linguistic lesson for the student, wherein the lesson plan comprises one or more drills for one or more selected linguistic concepts to be covered in the linguistic lesson, wherein the one or more selected linguistic concepts for the linguistic lesson are selected based on a probability that the student knows the one or more selected linguistic concepts based on the student model, wherein the one or more drills comprise prompts, wherein the prompts comprise word prompts and sentence prompts, wherein words for the word prompts and sentences for the sentence prompts are selected for the linguistic lesson from the lexicon database and the sentence database based on the words in the word prompts and words in the sentences in the sentence prompts being indexed to the one or more selected linguistic concepts in the linguistic lesson, such that words and sentences that are unknown to the student, based on the student model for the student, are excluded from the lesson plan;

prior to administration of the linguistic lesson by the tutor to the student, transmitting, by the one or more servers of the host server system, the lesson plan to a tutor mobile computing device that is remote from and in communication with the host server system via a data network;

during administration of the linguistic lesson:
 receiving, via a touchscreen interface of a student mobile computing device that is in communication with the tutor mobile computing device during administration of the linguistic lesson, a response by the student to a prompt from the tutor;
 transmitting from the student mobile computing device to the tutor mobile computing device, the student's response; and
 displaying, by a display of the student mobile computing device, the student's response; and after administration of the linguistic lesson:
 receiving, by the one or more servers of the host server system from the tutor mobile computing device via the data network, student response data indicative of hint levels needed by the student for each drill in the lesson plan, wherein the tutor records the hint level needed by the student for each drill on the tutor mobile computing device by selecting a corresponding hint level icon displayed on the tutor mobile computing device; and
 updating the student model for the student based on the student response data received from the tutor mobile computing device.

* * * * *